(12) United States Patent
Busch et al.

(10) Patent No.: US 12,293,196 B2
(45) Date of Patent: May 6, 2025

(54) SYSTEMS AND METHODS FOR GENERATING WAKE SIGNALS FROM KNOWN USERS

(71) Applicant: SYNTIANT, Irvine, CA (US)

(72) Inventors: Kurt F. Busch, Laguna Hills, CA (US); Jeremiah H. Holleman, III, Irvine, CA (US); Pieter Vorenkamp, Laguna Beach, CA (US); Stephen W. Bailey, Irvine, CA (US); David Christopher Garrett, Tustin, CA (US)

(73) Assignee: SYNTIANT, Irvine, CA (US)

( * ) Notice: Subject to any disclaimer, the term of this patent is extended or adjusted under 35 U.S.C. 154(b) by 165 days.

(21) Appl. No.: 17/151,152

(22) Filed: Jan. 16, 2021

(65) Prior Publication Data

US 2021/0224078 A1    Jul. 22, 2021

Related U.S. Application Data

(60) Provisional application No. 62/962,316, filed on Jan. 17, 2020.

(51) Int. Cl.
*G06F 15/177*     (2006.01)
*G06F 9/00*       (2018.01)
*G06F 9/4401*     (2018.01)
*G06F 16/22*      (2019.01)
(Continued)

(52) U.S. Cl.
CPC ............ *G06F 9/4418* (2013.01); *G06F 16/22* (2019.01); *G06N 3/042* (2023.01); *G06N 3/08* (2013.01)

(58) Field of Classification Search
CPC ...... G06F 9/4418; G06F 16/22; G06N 3/0427; G06N 3/08; G06N 3/063
See application file for complete search history.

(56) References Cited

U.S. PATENT DOCUMENTS

| 2016/0077574 A1* | 3/2016 | Bansal ................ G06F 1/3293 704/275 |
| 2017/0011736 A1* | 1/2017 | Li ...................... G10L 19/0208 |
| 2019/0287536 A1 | 9/2019 | Sharifi et al. |

(Continued)

OTHER PUBLICATIONS

PCT International Search Report, PCT Application No. PCT/US21/13780, mailed Aug. 4, 2021.

*Primary Examiner* — Xuxing Chen
(74) *Attorney, Agent, or Firm* — Rutan & Tucker LLP; Hani Z. Sayed; Ravi Mohan (57) ABSTRACT

Provided herein is an integrated circuit including, in some embodiments, a host processor, a digitally implemented neural network co-processor, and a communications interface between the host processor and the co-processor configured to transmit information therebetween. The special-purpose host processor can be operable as a stand-alone processor. The neural network co-processor may include a digitally implemented neural network. The co-processor is configured to enhance special-purpose processing of the host processor through an artificial neural network. In such embodiments, the host processor is wake keyword identifier processor configured to transmit one or more detected patterns to the co-processor over a communications interface. The co-processor is configured to transmit the recognized patterns to the host processor which can then identify and verify wake keywords spoken by a known user.

19 Claims, 8 Drawing Sheets

(51) Int. Cl.
*G06N 3/042* (2023.01)
*G06N 3/08* (2023.01)

(56) References Cited

U.S. PATENT DOCUMENTS

| | | | |
|---|---|---|---|
| 2019/0355365 A1* | 11/2019 | Kim | G06F 1/3209 |
| 2020/0005795 A1 | 1/2020 | Chae | |
| 2020/0020334 A1 | 1/2020 | Kang et al. | |
| 2020/0027462 A1* | 1/2020 | Wang | G10L 15/28 |
| 2020/0051554 A1* | 2/2020 | Kim | G06F 3/167 |
| 2020/0092519 A1* | 3/2020 | Shin | H04N 7/152 |
| 2020/0118544 A1* | 4/2020 | Lee | G10L 15/063 |
| 2020/0160863 A1* | 5/2020 | Lee | G10L 15/1815 |
| 2020/0221223 A1* | 7/2020 | Zhou | G10L 15/08 |
| 2020/0349180 A1* | 11/2020 | Kempf | G06F 16/367 |
| 2021/0335360 A1* | 10/2021 | Chung | G10L 15/142 |
| 2021/0358496 A1* | 11/2021 | Sukumar | G10L 15/08 |
| 2022/0044670 A1* | 2/2022 | Shim | H04R 29/005 |

* cited by examiner

SYSTEMS AND METHODS FOR GENERATING WAKE SIGNALS FROM KNOWN USERS

PRIORITY

This application claims the benefit of and priority to U.S. Provisional Application No. 62/962,316, filed Jan. 17, 2020, which is incorporated in its entirety herein.

FIELD

The field of the present disclosure generally relates to digital implementations of neural networks. More particularly, the field of the invention relates to an apparatus and a method for a low-power, always-on pattern detector.

BACKGROUND

Traditional central processing units ("CPUs") process instructions based on "clocked time." Specifically, CPUs operate such that information is transmitted at regular time intervals. Based on complementary metal-oxide-semiconductor ("CMOS") technology, silicon-based chips may be manufactured with more than 5 billion transistors per die with features as small as 10 nm. Advances in CMOS technology have been parlayed into advances in parallel computing, which is used ubiquitously in cell phones and personal computers containing multiple processors.

However, as machine learning is becoming commonplace for numerous applications including bioinformatics, computer vision, video games, marketing, medical diagnostics, online search engines, etc., traditional CPUs are often not able to supply a sufficient amount of processing capability while keeping power consumption low. In particular, machine learning is a subsection of computer science directed to software having the ability to learn from and make predictions on data. Furthermore, one branch of machine learning includes deep learning, which is directed at utilizing deep (multilayer) neural networks.

Currently, research is being done to develop direct hardware implementations of deep neural networks, which may include systems that attempt to simulate "silicon" neurons (e.g., "neuromorphic computing"). Digitally implemented neural network chips (e.g., silicon computing chips and associated processing systems designed for neuromorphic computing) operate by processing instructions in parallel (e.g., in contrast to traditional sequential computers) using bursts of electric current transmitted at non-uniform intervals. As a result, digitally implemented neural network chips require far less power to process information, specifically, artificial intelligence ("AI") algorithms. To accomplish this, neural network chips may contain as much as five times as many transistors as a traditional processor while consuming up to thousands of times less power. Thus, the development of digitally implemented neural network chips is directed to provide a chip and/or processor with vast processing capabilities that consumes far less power than conventional processors. Further, digitally implemented neural network chips are designed to support dynamic learning in the context of complex and unstructured data.

There is an ongoing need for the development and enhancement of special-purpose processing capabilities such as that found in, for example, keyword detectors for hands-free operation of mobile devices, and speaker recognition. For example, many devices require a user to speak a specialized word or phrase to activate the device. Many device manufacturers have attempted to make the activation word or phrase as simple as possible. Unfortunately, the simpler the word or phrase, the higher the chance is that the device may hear the word or phrase spoken inadvertently or by someone not trying to interact with the device (such as a person on the television, etc.). This can lead to false activations of the device which can lead to increased power consumption, lower battery lifespans, and increased costs as the device may need to connect to a conversation agent which can incur fees.

BRIEF DESCRIPTION OF THE DRAWINGS

The drawings refer to embodiments of the present disclosure in which.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In response to the increased demand in the market, more computing devices are being sold that utilize some form of voice control and/or activation. In order to provide timely responses to commands given by a user, the computing devices must almost always remain in a listening state. This creates an increased power demand as the computing device must always be listening instead of being powered down. Additionally, activations words can be so simple that it may become more commonplace for the computing device to inadvertently hear the activation command. In many cases, each time a computing device is activated, it powers up, and establishes an external connection to a conversation agent to facilitate a dialogue with the user. Some conversation agents can charge a fee to outside users and at least incur a cost in resources and power used. Therefore, there is a need to reduce power and false activations to reduce power consumption and costs. This can be accomplished by establishing a lower power consumption mode utilizing digitally implemented neural networks circuits and filtering activation words of known users from unknown users. The disclosure herein describes systems and methods to generate activation ("wake") signals from known users.

In the following description, certain terminology is used to describe features of the invention. For example, in certain situations, the term "logic" may be representative of hardware, firmware and/or software that is configured to perform one or more functions. As hardware, logic may include circuitry having data processing or storage functionality. Examples of such circuitry may include, but are not limited or restricted to a microprocessor, one or more processor cores, a programmable gate array, a microcontroller, a controller, an application specific integrated circuit, wireless receiver, transmitter and/or transceiver circuitry, semiconductor memory, or combinatorial logic.

The term "neural network" or "artificial neural network" may include any computing circuits that comprise a neuromorphic and/or digital implementations of a neural network. These circuits may include emulation of a plurality of neural structures and/or operations of a biologically-based brain and/or nervous system. Some embodiments of neural network circuits may comprise probabilistic computing, which can create algorithmic approaches to dealing with uncertainty, ambiguity, and contradiction in received input data. Neural network circuits can be composed of very-large-scale integration (VLSI) systems containing electronic analog circuits, digital circuits, mixed-mode analog/digital VLSI, and/or software systems.

The term "conversation agent" may include any program, routine, API, and/or service that facilitates a dialogue between a user and a computing system. Typically, conversation agents can provide tools necessary for natural language processing and other linguistics data that can allow a computing device to interact with a user via user speech commands and auditory responses. In many embodiments, a computing device utilizes a conversation agent by generating a connection to one. Often, a computing device does not contain the conversation agent, but may establish a connection to one over a network, such as the Internet.

The term "process" may include an instance of a computer program (e.g., a collection of instructions, also referred to herein as an application). In one embodiment, the process may be included of one or more threads executing concurrently (e.g., each thread may be executing the same or a different instruction concurrently).

The term "processing" may include executing a binary or script, or launching an application in which an object is processed, wherein launching should be interpreted as placing the application in an open state and, in some implementations, performing simulations of actions typical of human interactions with the application.

The term "object" generally refers to a collection of data, whether in transit (e.g., over a network) or at rest (e.g., stored), often having a logical structure or organization that enables it to be categorized or typed. Herein, the terms "binary file" and "binary" will be used interchangeably.

The term "file" is used in a broad sense to refer to a set or collection of data, information or other content used with a computer program. A file may be accessed, opened, stored, manipulated or otherwise processed as a single entity, object or unit. A file may contain other files and may contain related or unrelated contents or no contents at all. A file may also have a logical format, and/or be part of a file system having a logical structure or organization of plural files. Files may have a name, sometimes called simply the "filename," and often appended properties or other metadata. There are many types of files, such as data files, text files, program files, and directory files. A file may be generated by a user of a computing device or generated by the computing device. Access and/or operations on a file may be mediated by one or more applications and/or the operating system of a computing device. A filesystem may organize the files of the computing device of a storage device. The filesystem may enable tracking of files and enable access of those files. A filesystem may also enable operations on a file. In some embodiments the operations on the file may include file creation, file modification, file opening, file reading, file writing, file closing, and file deletion.

The term "host processor" includes a primary processor such as a CPU or digital signal processor (DSP) of an IC in a system. The host processor is one that can stand alone but benefits from the addition of neural networks provided by a specialized IC or processor thereof through the microcontroller interface.

The term "co-processor" includes an additional processor interfaced with the host processor through a microcontroller interface. The additional processor can be configured to perform functions not possible with the host processor alone or functions the co-processor can perform faster or at lower power.

The term "enhancement filter" includes a filter configured to suppress undesired noise in a signal by selectively attenuating or boosting certain components of the signal on a time-varying basis. Likewise, "enhancement filtering" includes filtering to suppress undesired noise in a signal by selectively attenuating or boosting certain components of the signal on a time-varying basis.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Figure 1:
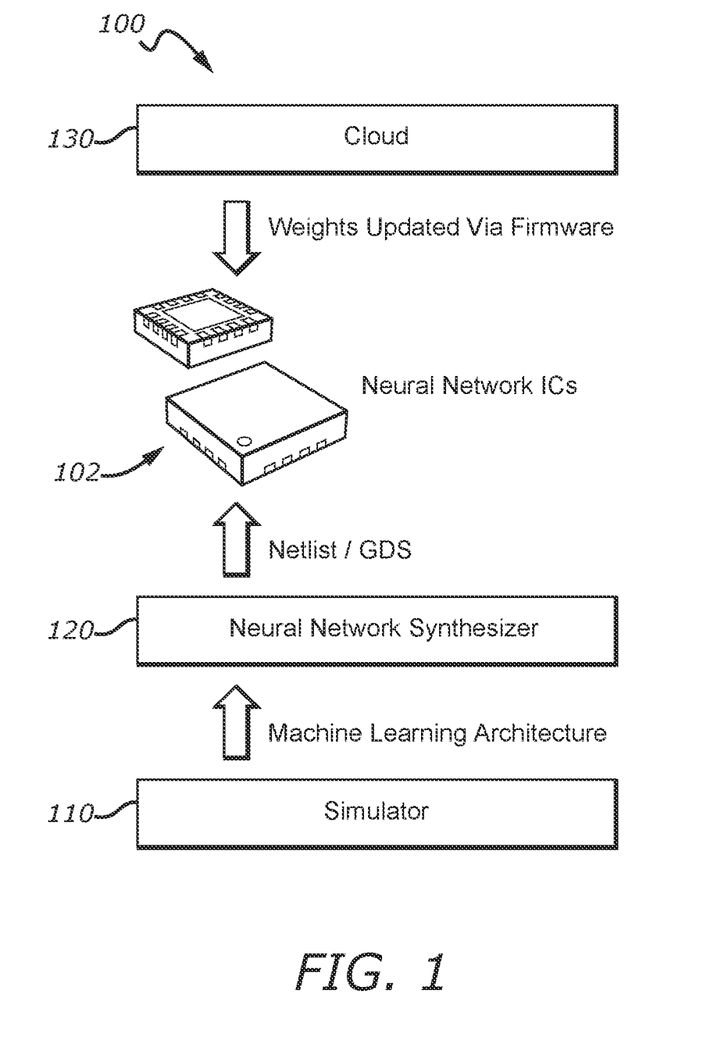
FIG. 1 provides a schematic illustrating an exemplary embodiment of a system for designing and updating digitally implemented neural networks integrated circuits ("ICs") in accordance with some embodiments.

Referring now to FIG. 1, a schematic illustrating a system 100 for designing and updating neural network ICs is provided in accordance with some embodiments. As shown, the system 100 can include a simulator 110, a neural network synthesizer 120, and a cloud-based computer system 130 ("cloud") configured for designing and updating neural network ICs such as neural network IC 102. As further shown, designing and updating neural network ICs can include creating a machine learning architecture with the simulator 110 based on a particular problem. As those skilled in the art can appreciate, cloud-based computer systems may include, but are not limited to systems that can provide software as a service ("SaaS"), platform as a service ("PaaS"), and or infrastructure as a service ("IaaS") resource. The neural network synthesizer 120 can subsequently transform the machine learning architecture into a netlist directed to the electronic components of the neural network IC 102 and the nodes to which the electronic components are connected. In addition, the neural network synthesizer 120 can transform the machine learning architecture into a graphic database system ("GDS") file detailing the IC layout for the neural network IC 102. From the netlist and the GDS file for the neural network IC 102, the neural network IC 102, itself, can be fabricated in accordance with current IC fabrication technology. Once the neural network IC 102 is fabricated, it can be deployed to work on the particular problem for which it was designed. While the initially fabricated neural network IC 102 can include an initial firmware with custom synaptic weights between the nodes, the initial firmware can be updated as needed by the cloud 130 to adjust the weights. Being as the cloud 130 is configured to update the firmware of the neural network IC 102, the cloud 130 is not needed for everyday use.

Neural network ICs such as the neural network IC 102 can be up to magnitudes of order more energy efficient than graphics processing unit ("GPU") solutions and up to a hundred times or more energy efficient than digital CMOS solutions with accuracies meeting or exceeding comparable software solutions. This makes such neural network ICs highly suitable for battery powered applications.

Neural network ICs such as the neural network IC 102 can be configured for application specific standard products ("ASSP") including, but not limited to, keyword detection, voice recognition, sound identification, and/or one or more audio filters. For example, if the particular problem is one of detecting keywords, the simulator 110 can create a machine learning architecture with respect to one or more aspects of spoken word identification. The neural network synthesizer 120 can subsequently transform the machine learning architecture into a netlist and a GDS file corresponding to a neural network IC for word identification, which can be fabricated in accordance with current IC fabrication technology. Once the neural network IC for word identification is fabricated, it can be deployed to work on spotting instances of keywords in or with, for example, a computing device as detailed further herein.

Neural network ICs such as the neural network IC 102 can be deployed in a variety of devices including, but not limited to, toys, sensors, wearables, augmented reality ("AR") systems or devices, virtual reality ("VR") systems or devices, mobile systems or devices, appliances, Internet-of-things ("IT") devices, or hearing systems or devices.

Figure 2:
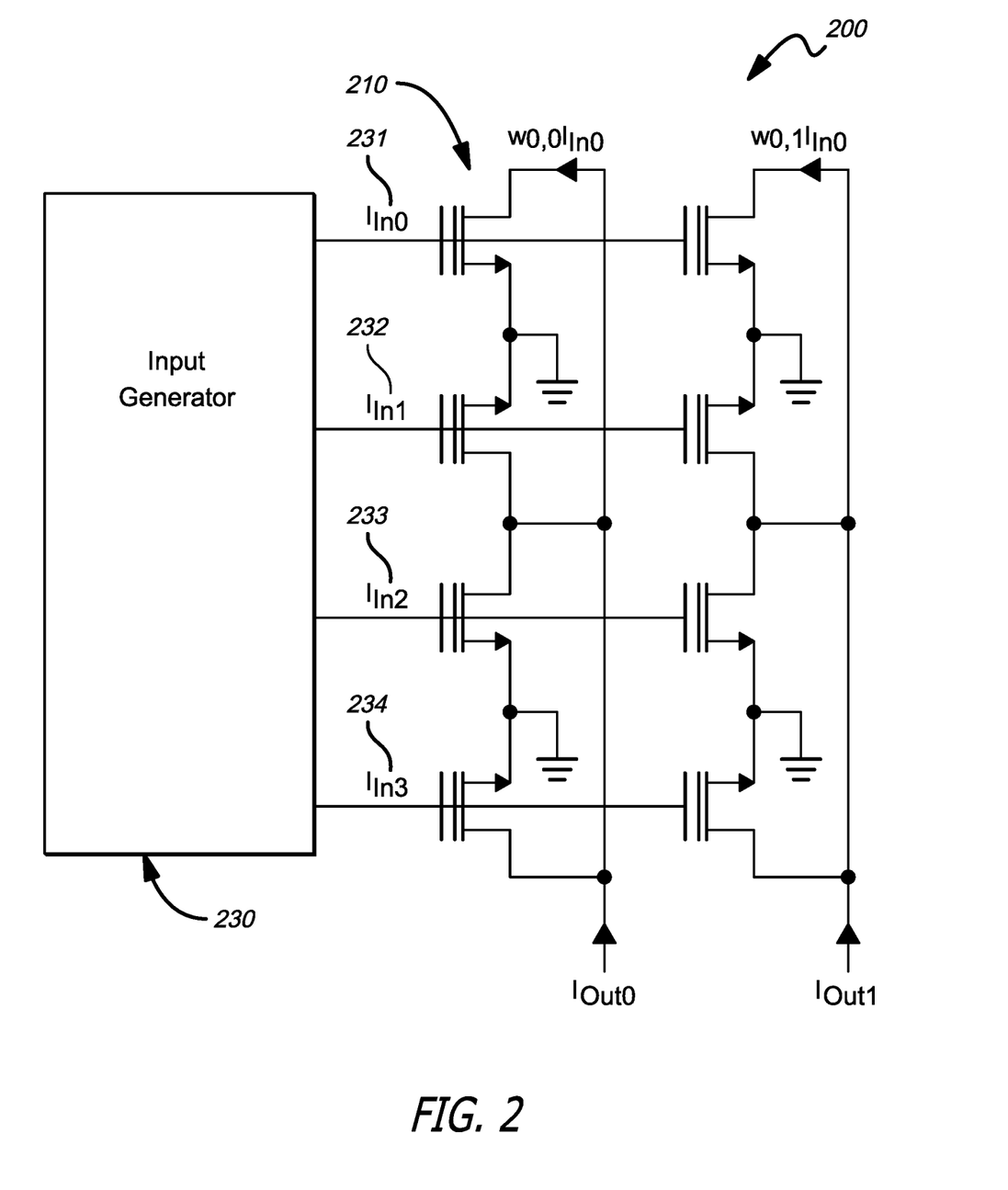
FIG. 2 provides a schematic illustrating an exemplary embodiment of an analog multiplier array in accordance with some embodiments.

Referring now to FIG. 2, a schematic illustrating an analog multiplier array 200 is provided in accordance with many embodiments. Such an analog multiplier array can be based on a digital NOR flash array in that a core of the analog multiplier array can be similar to a core of the digital NOR flash array or the same as a core of the digital NOR flash array. That said, at least select and read-out circuitry of the analog multiplier array are different than a digital NOR array. For example, output current is routed as an analog signal to a next layer rather than over bit lines going to a sense-amp/comparator to be converted to a bit. Word-line analogs are driven by analog input signals rather than a digital address decoder. Furthermore, the analog multiplier array 200 can be used in neural network ICs such as the neural network IC 102. For example, a neural network can be disposed in the analog multiplier array 200 in a memory sector of a neural network IC.

Since the analog multiplier array 200 is an analog circuit, input and output current values (or signal values) can vary in a continuous range instead of simply on or off. This is useful for storing weights, or coefficients, of a neural network as opposed to digital bits. In operation, of certain embodiments, the weights are multiplied in a core by input current values 231, 232, 233, 234 to provide output current values that are combined to arrive at a decision of the neural network. Further, the analog multiplier array 200 can utilize standard programming and erase circuitry to generate tunneling and erase voltages. In many embodiments, the input current values 231, 232, 233, 234 are provided by an input generator 230. Those skilled in the art will recognize that such input current values can be generated or obtained from a variety of devices or other components within the system. Furthermore, stored charge within a multiplier 210 can shift voltage on the floating gate and scales drain current by a weight w.

Figure 3:
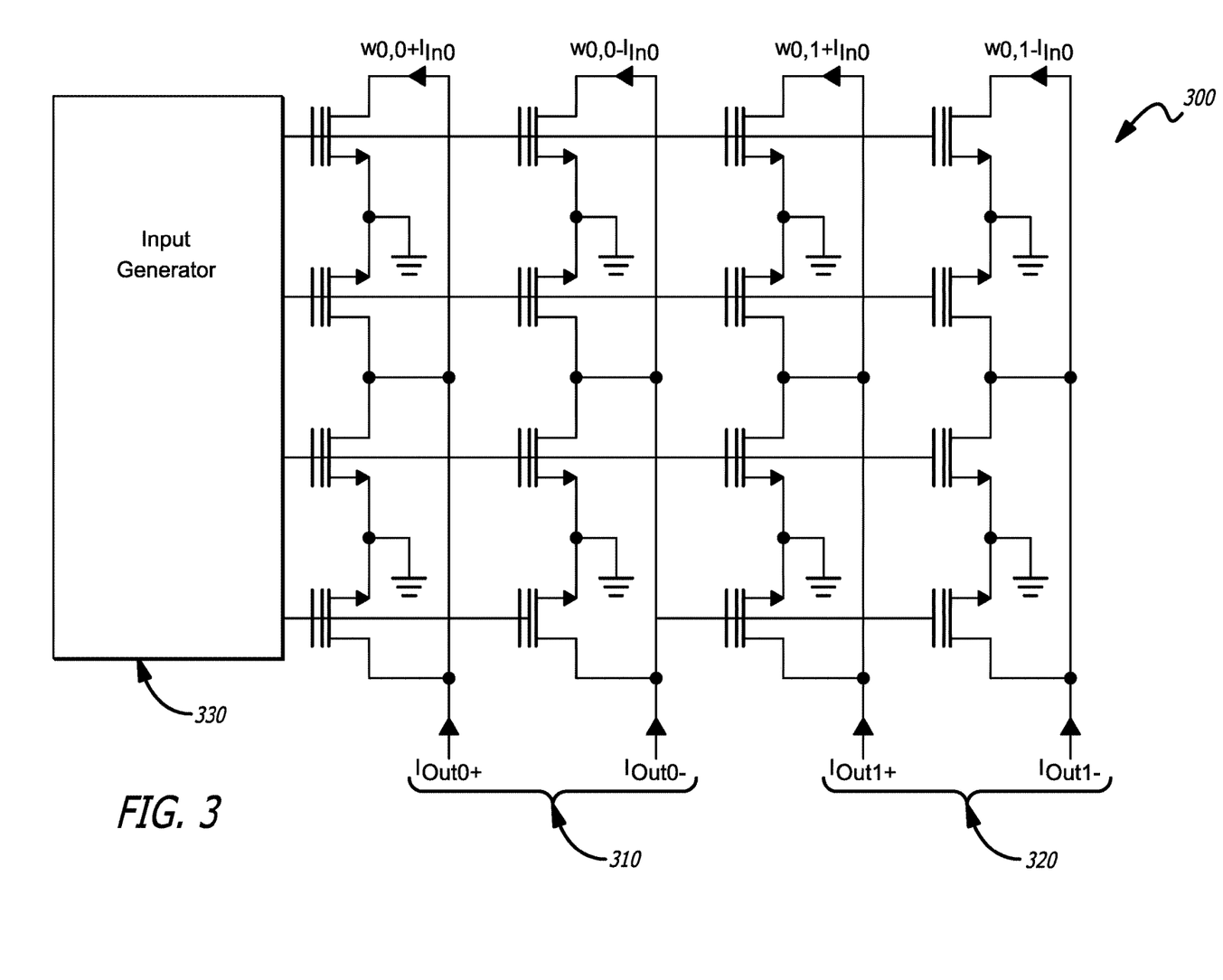
FIG. 3 provides a schematic illustrating an exemplary embodiment of an analog multiplier array in accordance with some embodiments.

Referring now to FIG. 3, a schematic illustrating an analog multiplier array 300 is provided in accordance with some embodiments. The analog multiplier array 300 can use two transistors (e.g., a positive transistor and a negative transistor) such as, but not limited to, a metal-oxide semiconductor field effect transistor ("MOSFET") or field-effect transistor ("FET") to perform a two-quadrant multiplication of a signed weight (e.g., a positive weight or a negative weight) and a non-negative input current value. In many embodiments, the input current values can be provided by a separate input generator 330. The input generator 330 can be similar to that of the input generator depicted in FIG. 2 in certain embodiments. If an input current value provided by the input generator 330 is multiplied by a positive or negative weight, the product or output current value can respectively be either positive or negative. A positively weighted product can be stored in a first column (e.g., column corresponding to $I_{Out0+}$ in the analog multiplier array 300), and a negatively weighted product can be stored in a second column (e.g., column corresponding to $I_{Out0-}$ in the analog multiplier array 300). By way of example and not limitation, $I_{Out0+}$ and $I_{Out0-}$ can be taken as a differential current output 310, 320 that can then be provided to a plurality of current-sensing circuitry including, but not limited to, current mirrors, charge integrators, and/or transimpedance amplifiers. The foregoing differential outputs 310, 320 can provide positively and negatively weighted products or output signal values can be taken as a differential current value to provide useful information for making a decision.

Because each output current from the positive or negative transistor is wired to ground and proportional to the product of the input current value and the positive or negative weight, respectively, the power consumption of the positive or negative transistor is at or near zero when the input current values or weights are at or near zero. That is, if the input signal values are '0,' or if the weights are '0,' then no power will be consumed by the corresponding transistors of the analog multiplier array 300. This is significant because in many neural networks, a large fraction of the values or the weights can be '0,' especially after training. Therefore, due to the composition of the embodiments herein, energy is saved when there is nothing to do or going on. This is unlike differential pair-based multipliers, which consume a constant current (e.g., by means of a tail bias current) regardless of the input signal.

Figure 4:
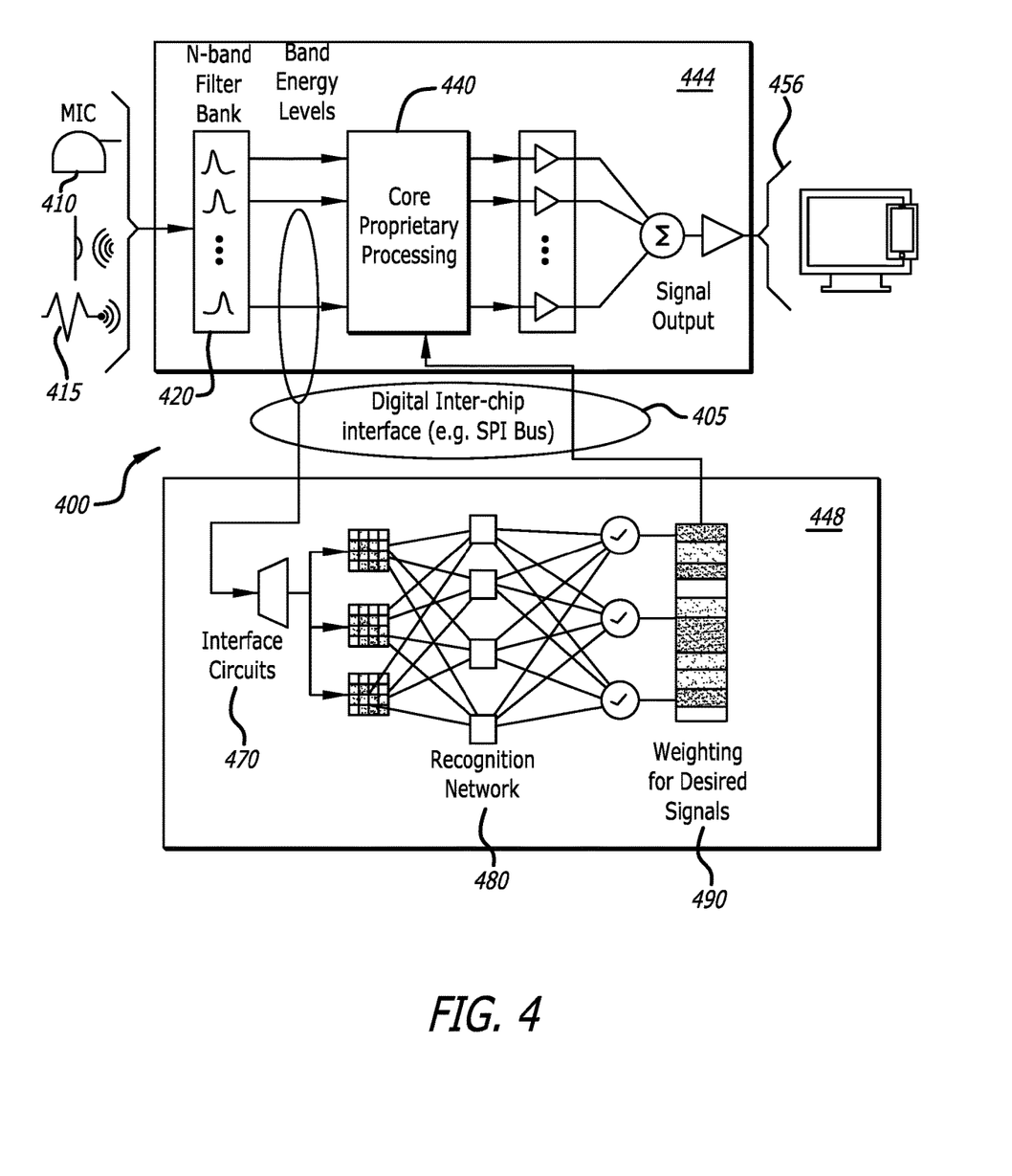
FIG. 4 is a schematic illustrating an exemplary embodiment of a generalized detection system that includes a pattern detection host processor and a co-processor of a digitally implemented neural networks IC, in accordance with some embodiments.

Referring now to FIG. 4, a schematic is provided illustrating a digital inter-chip interface 405 between a neural network IC 448 and a host processor 444 in accordance with some embodiments. While the neural network IC 448 and the host processor 444 are shown as two distinct ICs in FIG. 4, it should be understood that the foregoing ICs can alternatively be embodied in a single monolithic IC. As such, description regarding the keyword spotter 400 between the co-processor of the neural network IC 448 and the host processor 444 should also be taken to describe the digital inter-chip interface 405 between a digitally implemented neural network co-processor within the neural network IC and special-purpose host processor of a single monolithic IC; that is, unless context clearly indicates otherwise.

As shown in FIG. 4, the host processor 444 can include, but is not limited to, an IC for speech recognition systems or devices including keyword spotters, speaker identification systems, or audio data detection systems. In many embodiments, an IC for a keyword spotter can include a keyword identifier host processor 440 (see "Core Proprietary Processing" in FIG. 4) comprising the host processor 444, as well as a microphone 410 (or other audio data source 415), a filter bank 420, and a signal output to external systems 456. In some embodiments, the external system 456 can include further devices and/or systems that can be configured to receive a "wake up" signal from the keyword spotter before powering up from a "sleep" or lower power consuming mode.

It should be understood that a digitally implemented neural network co-processor can be interfaced with any one or more of a number of special-purpose host processors. The foregoing embodiments of the neural network co-processor interfaced with the keyword identifier host processor are merely provided for exposition. It should be understood that extension to other ASSPs might need certain modifications in line with the specific functions of the other ASSPs.

As shown in FIG. 4, in the case of speech recognition, the neural network IC 448 or a portion of the above-referenced single monolithic IC corresponding to the neural network IC 448 may include, but is not limited to, interface circuits 470, a deep-speech enhancement network with cloud-updateable synaptic weights, and a database of desired keywords. In some embodiments, the synaptic weights may be stored on a non-volatile memory, such as a flash memory or other suitable medium that is accessible to the neural network IC 448. Again, the host processor 444 or a portion of the above-referenced single monolithic IC corresponding to the host processor 444 may include, but is not limited to, the keyword identifier host processor 440, the microphone 410 (or other audio data source 415), the filter bank 420, and the suitable analog and/or digital signal output. The neural network IC 448 and the host processor 444 can be configured to communicate over a digital inter-chip interface 405 such as a serial peripheral interface ("SPI") bus or inter-integrated circuit ("I2C") bus.

The keyword identifier host processor 440 can be configured to transmit frequency elements or signal spectrum information in the form of Fourier transforms or similar frequency decompositions over the digital inter-chip interface 405 to the neural network co-processor for audio signal-processing tasks such as audio enhancement or de-noising. The neural network IC 448 may receive these tasks via interface circuits 470. The neural network co-processor can be configured to subsequently perform word recognition tasks via a recognition network 480 and transmit results back over the digital inter-chip interface 405 to the keyword identifier host processor 440. The word recognition tasks may generate weighting data for desired signals 490 which may also be utilize and/or stored for future use.

In some embodiments, the neural network co-processor may have access to a database comprising a list of keywords and/or known users whereby spoken keywords and speakers may be identified. In some embodiments, the results that are sent back to the host processor 444 may include weighting signals for desired words and/or speakers that are detected. The keyword identifier host processor 440 may be configured to subsequently transmit one or more signals indicating detection of a desired keyword and/or speaker.

In certain embodiments, the keyword identifier host processor 440 identifies if a particular keyword is being said by a known speaker. Known speakers can be derived from a variety of sources including a pre-determined list of authorized users. These known speakers can generate a plurality of features within their speech that are unique to that speaker. These unique features can be utilized to identify words spoken by the known user against words spoken by an unidentified user. By limiting the generation of wake signals to only known users, the keyword spotter 400 can reduce the number of incorrect wake up signals generated, which can decrease the amount of power and/or resources used by external systems 456.

In response to the determination by the neural network IC 448 that a keyword was detected and was spoken by a known user, a particular signal, such as a "wake" signal can be generated. Wake signals can be utilized by an external system 456 to turn on additional components and/or enter a higher power consumption mode. In certain embodiments, the generation of the wake signal is determined within the host processor 444 in response to data related to the keyword and speaker being detected in the neural network IC 448. Conversely, some embodiments may provide for the neural network IC 448 to provide the determination for a wake signal generation which is then transmitted back to the host processor 444.

In further embodiments, the one or more wake signals may be comprised of signals that are sent to other special purpose ICs that are configured to perform specific tasks when desired keywords are detected. In a number of embodiments, the synaptic weights of the recognition network 480 can be updated either periodically or in response to a manual update process. In additional embodiments, the synaptic weights may be modified dynamically based on feedback given by the user and/or system.

It is contemplated that host processors 444 and neural network ICs 448 can be implemented in a single system or system on a chip ("SoC") configuration. It is also contemplated that certain embodiments may have either the host processor 444 and/or the neural network IC 448 implemented remotely with the digital inter-chip interface 405 being through a network connection.

Figure 5:
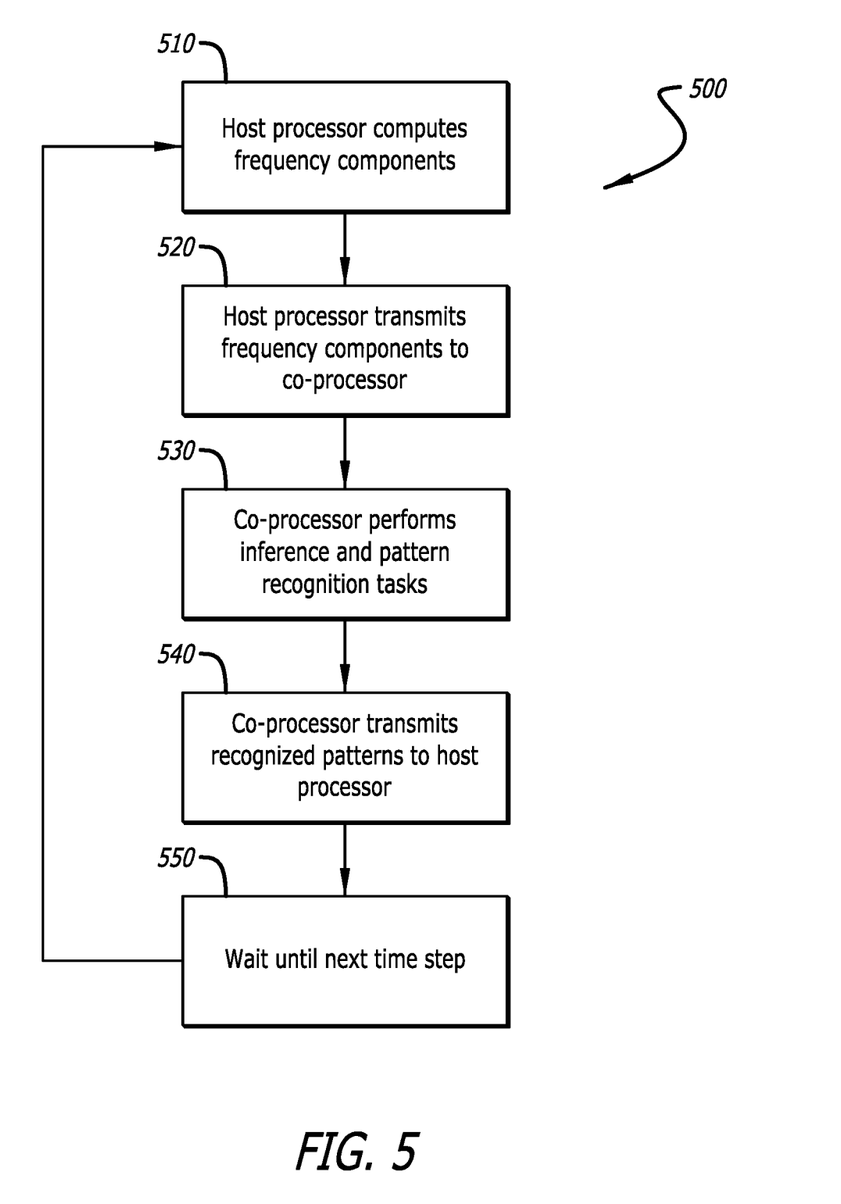
FIG. 5 provides a schematic illustrating an exemplary method of a neural network IC for detecting signal patterns received by way of various sensors, in accordance with some embodiments.

Referring now to FIG. 5, a schematic is provided illustrating a method 500 of a neural network IC for detecting signal patterns, received, for example, by way of the microphone 410 or other audio data source 415, in accordance with some embodiments. As shown, the method includes 1) a first step 510 where the pattern detection host processor computes frequency components; 2) a second step 520 where the pattern detection host processor transmits the frequency components to the neural network co-processor; 3) a step 530 where the neural network co-processor performs inference and identifies desired patterns from among the frequency components; 4) a step 540 where the neural network co-processor transmits the identified patterns to the pattern detection host processor; and 5) a step 550 where the neural network co-processor waits until the next time step.

In many embodiments, the patterns identified by the neural network co-processor are associated with keywords and/or known users. In certain embodiments, the pattern identification for keywords can be separate from the identification done for known users. This separation can include sequentially identifying keywords and then known users on the same neural network IC, it may be done in parallel on a neural network IC that has multiple recognition networks, and/or it may be accomplished on a plurality of neural network ICs that all communicate with the host processor via one or more inter-chip interfaces. In other embodiments, the recognition network and weighting for desired signals and patterns can be configured to recognize patterns associated with keywords spoken from a known speaker. This is in contrast to recognizing keywords and then processing those recognized keyword patterns against known speaker patterns. Instead, these embodiments may look for patterns specifically associated with keywords from the known speakers as a single type of data.

Figure 6:
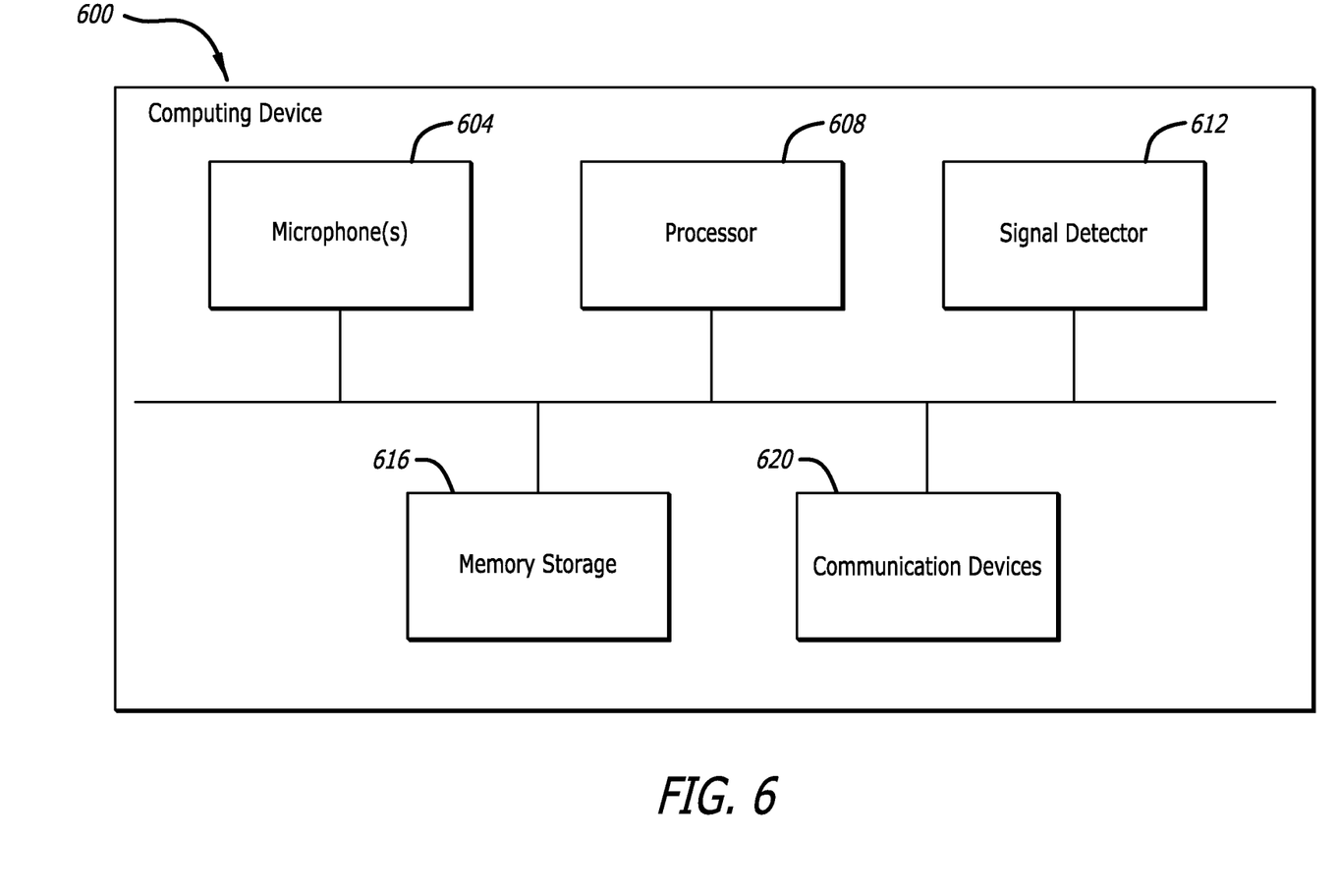
FIG. 6 provides a block diagram illustrating components comprising an exemplary computing device that includes a signal detector in accordance with some embodiments.

FIG. 6 is a block diagram illustrating components of an exemplary computing device 600 that may include a signal detector 612, including, but not limited to a keyword spotter and/or a known user detector as disclosed herein in connection with FIG. 4. In the illustrated embodiment, the computing device 600 may include one or more microphone(s) 604, at least one processor 608, a signal detector 612, a memory storage 616, and one or more communication devices 620. In some embodiments, the computing device 600 may also include additional or other components necessary for operation of the computing device 600. In some embodiments, the computing device 600 may include fewer components that perform similar or equivalent functions to those described herein.

In some embodiments, acoustic signals, once received, for example, as captured by the microphone(s) 604, may be converted into electric signals, which, in turn, may be converted, by the signal detector 612, into digital signals for processing in accordance with some embodiments. The processed signals may be transmitted for further processing to the processor 608. In some embodiments, some of the microphones 604 may be digital microphone(s) operable to capture acoustic signals and output digital signals. Some of the digital microphone(s) may provide for voice activity detection, or vocalization detection, and buffering of the audio data significantly prior to the vocalization detection.

The signal detector 612 may be operable to process an acoustic signal. In some embodiments, the acoustic signal is captured by the microphone(s) 604. In various embodiments, acoustic signals detected by the microphone(s) 604 may be utilized by the signal detector 612 to separate desired speech (for example, keywords) from ambient noise as well as speech generated by known speakers from unknown speakers, providing more robust automatic speech recognition (ASR) and generating fewer false wake-up signals.

In some embodiments, the signal detector 612 may comprise a neural network IC and a special purpose IC such as those depicted in FIG. 4. The signal detector 612 may be configured to transmit one or more signals indicating identification of desired keywords, known speakers, or other sounds and/or identifying data. In some embodiments, the one or more signals may be sent to the processor 608 or other special purpose ICs that are configured to perform specific tasks when desired keywords, speakers, or other sounds are identified. Thus, the signal detector 612 may be configured to provide hands-free operation of the computing device 600.

In some embodiments, the signal detector 612 may be configured to remain in a low-power, always-on state whereby the signal detector 612 remains continuously ready to detect target information, such as specific keywords, and/or specific speakers. As will be recognized, conventional DSP detectors, such as keyword spotters, generally reside in a low-awareness, low-power consumption state until something in the environment, such as speech, occurs and then the entire DSP is powered-on to a higher-power consumption state. With the entire DSP powered-on, the conventional DSP keyword spotter is then placed into a fully-aware state whereby keywords may be detected. In the case of word detection, however, the time required to switch the DSP from low-power to full-power leads to latency wherein the keyword spotter may miss the first one or more words. In some implementations, latency can lead to adverse results. For example, in the instance of a DSP detector that is configured for security, the time wasted due to latency may lead to a loss of crucial evidence regarding a crime that has been committed.

Unlike conventional DSP detectors, the signal detector 612 can remain fully aware when the computing device 600 is placed into a low-power state. The signal detector 612 is capable of detecting changes in the environment, such as speech, without taking time to power-on other components before detection may occur. Thus, the signal detector 612 is configured to detect keywords, or other sounds, with substantially zero latency. It is contemplated that the fully aware state of the signal detector 612 may be achieved by operating the signal detector within a power envelop that is insignificant to the rest of the components comprising the computing device 600. In some embodiments, for example, the signal detector 612 may be implemented as the smallest component comprising the computing device 600, such that the signal detector may be powered by current leakage from the battery. As such, when the components comprising the computing device 600 are placed into a lower power, sleep mode, the signal detector 612 may continue operating in a fully aware state that is sustained by normal leakage current from the battery.

The processor 608 may include hardware and/or software operable to execute computer programs stored in the memory storage 616. The processor 608 may use floating point operations, complex operations, and other operations needed for implementations of embodiments of the present disclosure. In some embodiments, the processor 608 of the computing device 600 may include, for example, at least one of a DSP, an audio processor, a general-purpose processor, and/or similar processing units.

The exemplary computing device 600 may be operable, in various embodiments, to communicate over one or more wired or wireless communications networks, for example, via communication devices 620. In some embodiments, the computing device 600 may send at least audio signals (speech) over a wired or wireless communications network. In some embodiments, the computing device 600 may encapsulate and/or encode the at least one digital signal for transmission over a wireless network, such as a cellular network.

Moreover, it should be understood that the computing device 600 in general, and the signal detector 612 in particular, are not to be limited to detecting keywords for hands-free operation of the computing device 600. For example, in some embodiments, the computing device 600 may be configured for a security-related implementation. As such, the computing device 600 may be configured to detect previously defined adverse sounds, such as glass breaking, within a restricted area. Upon detecting an adverse sound, the signal detector 612 may be configured to output one or signals indicating to other components that the adverse sound has been detected. In some embodiments, for example, the signal detector 612 may trigger an alarm system upon detecting an adverse sound.

In an embodiment, the signal detector 612 is configured to operate in absence of an active connection to a communications network, such as the Internet or the cloud 130. As discussed in connection with FIG. 1, although the cloud 130 is configured to update the firmware of the signal detector 612, the cloud 130 may not be needed for everyday use of the signal detector 612. Those skilled in the art will appreciate that operating the signal detector 612 in an offline state, in absence of a connection to the cloud 130, is advantageously more secure than having an always-on connection to the cloud 130 or the Internet. For example, when the signal detector 612 is implemented in a security capacity, operating in the offline state prevents unwanted intrusion by way of connections from the cloud 130. In this way, once known users are determined, they can be installed within the computing device 600 before disconnection from the larger network. Further, the capability to operate in the offline state facilitates implementing the signal detector 612 where a connection to the cloud 130 is not always available, such as when the signal detector is implemented in a hearing aid or other type of low physical footprint device.

However, machine learning may be done by way of a connection with the cloud 130, as disclosed with respect to FIG. 1. In an embodiment, synaptic weights may be downloaded and stored to a non-volatile memory, such as flash memory or the memory storage 616. The stored synaptic weights may be accessed by the signal detector 612 so as to enable differentiating between signals received by the signal detector 612 in absence of the connection to the cloud 130. As will be appreciated, differentiating between the signals may enable the signal detector 612 to recognized keywords, and/or specific speakers, as desired.

In one embodiment, user-specific target information, such as specific keywords, and/or specific speakers, may be combined with an existing database to form a user-specific training set that may be used to train an existing neural network type model on the combined data to produce synaptic weights. A weight file may be generated and written into a chip that may execute user-specific functions associated with the target information.

Figure 7:
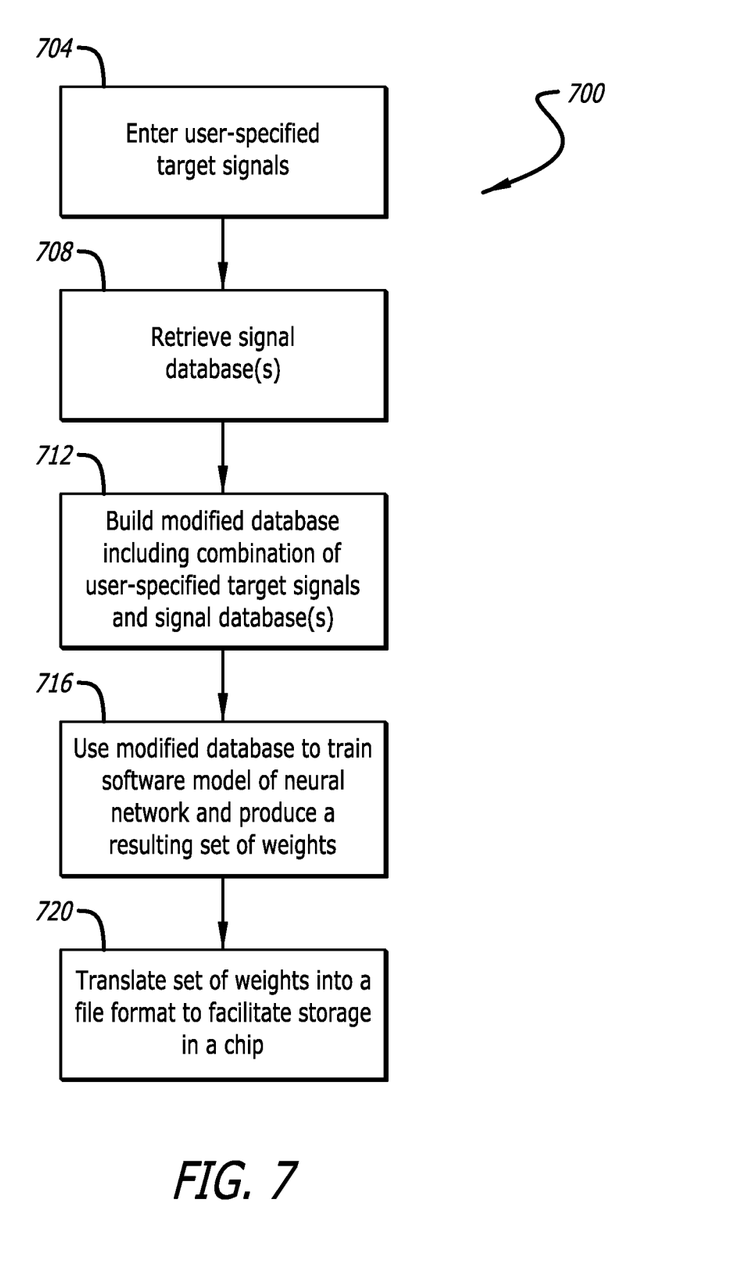
FIG. 7 is a schematic illustrating a method of generating a weight file that may be made available to a user for the purpose of executing desired user-specific functions in an offline state, according to the present disclosure.

FIG. 7 is a schematic illustrating a method 700 of generating a weight file that may be made available to a user for the purpose of executing desired user-specific functions. In an embodiment, the method 700 is performed by way of a web-based application, or other suitable software application. It is contemplated that the application may be a cloud-based application, or the application may be distributed as a stand-alone software, as desired. The method 700 may begin with a step 704 that enables the user, or a customer, to enter desired target signals into the application. User-specified target signals may be any type of signal that the user wants to detect. For example, the user-specified target signals may be spoken keywords, non-verbal acoustic signals such as specific sounds, signals, or classes to be detected by a smart device, and the like.

In an exemplary embodiment, wherein the signal detector 612 is a keyword spotter, the user may enter desired keywords in step 704. For example, the user may want the signal detector 612 to recognize personalized words, such as, by way of non-limiting example, "On," "Off," "Hotter", and "Colder," in addition to other, standard keywords that are already included in a keyword database.

In step 708, the application retrieves one or more signal databases that are comprised of target signals that may be detected by the signal detector 612. Continuing with the keyword spotter example, the signal databases may be comprised of standard keywords that may be detected by the signal detector 612, as described herein. In step 712, the user-specified target signals are combined with the one or more signal databases to build a modified database. In an embodiment, the user-specified target signals may be labeled with suitable, corresponding labels while all other signals may be identified by way of a generic label, such as "Other," for example.

The modified database may then be used to train a neural network implementation, in step 716, to recognize the signals that are included in the modified database. It is contemplated that the neural network implementation may be a software model of a neural network that is implemented in the hardware comprising the computing device 600. Training the neural network implementation generates a set of weights that may be used by the signal detector 612 to detect the target signals in the modified database. In step 720, the set of weights produced by way of step 716 can be translated into a file format suitable for being stored in the memory storage 616, or a flash memory, of the computing device 600. In some embodiments, a programming file comprised of the set of weights may be provided to an end-user upon purchasing the computing device 600. In some embodiments, the file may be programmed into one or more chips that may be purchased by the end-user.

Upon the end-user installing the file comprising the weights into the computing device 600, either by way of the above-mentioned programming file or the chips, the signal detector 612 may detect the target signals specified in the modified database. As will be appreciated, therefore, since training of the neural network comprising the signal detector 612 is performed externally of the computing device 600 and the resultant weights are stored in the memory storage 616, the signal detector 612 may continue detecting the target signals in the offline state, in absence of the cloud 130 or other network connections.

Figure 8:
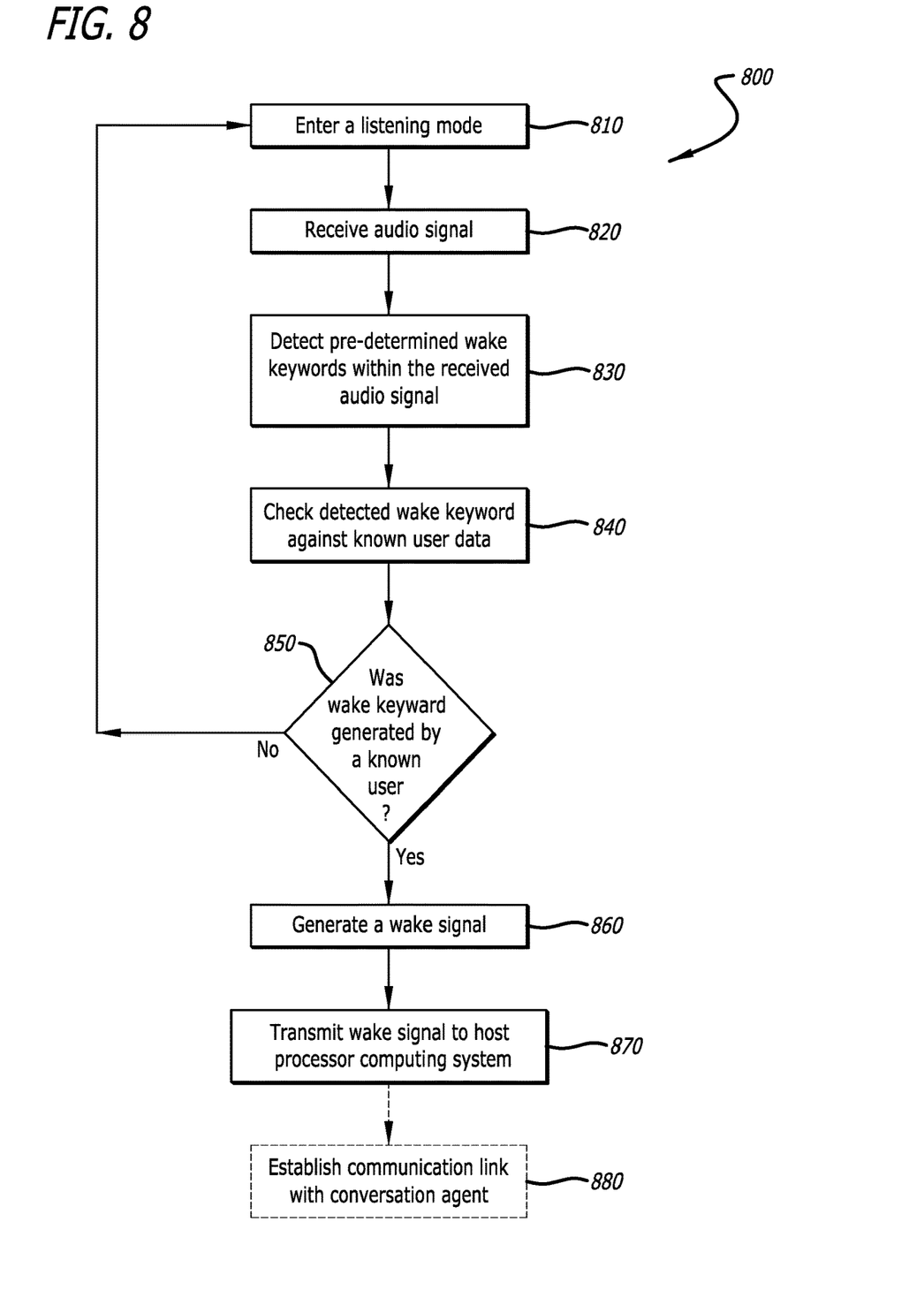
FIG. 8 is a schematic illustrating a method of generating a wake signal in response to the detection of a wake word generated by a known user, according to the present disclosure.

Referring to FIG. 8, a method of generating a wake signal in response to the detection of a wake word generated by a known user in accordance with an embodiment of the invention is shown. In many embodiments, the process 800 begins at step 810, when the computing device and/or keyword detector enters into a listening mode. As described above, the listening mode can be done by the signal detector which resides within a device in a lower-power consumption state such that the signal detector can provide low-latency recognition of audio signals. In step 820, the computing device receives one or more audio signals in the form of raw analog audio signals captured from one or more microphones or as digital data that represents particular sounds. The received audio signals can be captured from within the computing device, or can be remotely captured and transmitted to the computing device for processing. In step 830, the signal detector detects pre-determined wake keywords within the received audio signals. In many embodiments, the wake pre-determined wake signals are received from sounds picked-up within the direct proximity of the computing device. In step 840, the detected wake keywords are then processed and checked against known user data. Known user data can comprise a database with users who have been pre-authorized to wake the computing device. In some embodiments, the known users are determined by processing the detected wake signals though a separate recognition network to determine the source of the speaker. As described above, the checking of the detected wake signals against known users can be done sequentially or in parallel with step 830.

The process 800, at step 850 analyses if the detected wake signal was generated by a known user. When an unknown user generates the wake keyword, the computing system and keyword identifier re-enter a listing mode at step 810. In cases where a known user has generated the wake keyword, the process 800 enters step 860 and generates a wake signal.

Wake signals can be a data command, function call, and/or a change in voltage within the system. Wake signals can be generated from within a neural network IC, or within a host processor as a result of data received from the neural network IC. In step 870, the generated wake up signal is transmitted to the host processor and/or computing system. In many embodiments, the neural network IC can evaluate and determine if a wake keyword is present and if it was generated by a known user, leading to a wake signal being generated within the neural network IC which is then transmitted to the host processor to subsequently send out a system-wide wake signal. In other embodiments, the neural network IC transmits data relating to the recognized patterns within the received audio signal to the host processor which then determines if the audio signal includes a wake keyword and was generated by a known speaker. In these cases, the wake signal is generated and transmitted by the host processor. As those skilled in the art will understand, a combination of these options may be used as required by the application and can also be implemented remotely (i.e., not within the same device or within the same physical location).

In response to the transmission of the wake signal in step 870, the process 800 at step 880, can direct the computing system to establish a communication link with a conversation agent. In a variety of embodiments, the computing system can enter a higher-power consumption mode in response to the wake signal being received and subsequently establish the conversation agent link. In some embodiments, the computing system may be able to establish a communication link with the conversation agent without fully entering the higher-power consumption mode. In these cases, the conversation agent may be able to determine if the wake commands were valid or if the needed response requires more computing power necessitating a full wake up in the higher-power consumption mode. In this way, certain embodiments can further reduce power consumption.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. An integrated circuit, comprising:
   a co-processor configured to remain in a low-power, always-on state, the co-processor including an artificial neural network configured to:
   generate a wake signal and transmit the wake signal to a host processor; and
   identify one or more target signals among one or more signals;
   the host processor comprising a keyword identifier host processor configured to receive weighting signals;
   wherein synaptic weights of the artificial neural network are; i) modified dynamically based on feedback; ii) accessible in absence of a connection to a communications network; and iii) accessed by a signal detector to differentiate between signals received by the signal detector in absence of the connection to the communications network;
   a communications interface between the host processor and the co-processor configured to transmit information therebetween; and
   wherein the integrated circuit is configured to operate without an active connection to the communications network.

2. The integrated circuit of claim 1, wherein the target signal includes at least one wake keyword.

3. The integrated circuit of claim 1, further comprising verification of a source that includes identifying a speaker of the at least one wake keyword.

4. The integrated circuit of claim 3, wherein the verification further includes determining if the identified speaker is on a list of pre-authorized users.

5. The integrated circuit of claim 4, wherein the verification further includes generating verification data in response to verification of the identified speaker on the list of pre-authorized users.

6. The integrated circuit of claim 5, wherein the co-processor is further configured to transmit verification data to the host processor via the communications interface.

7. The integrated circuit of claim 1, wherein the wake signal is configured to change a computing device from a first power consumption mode into a second, higher power consumption mode.

8. The integrated circuit of claim 1, wherein the wake signal is configured to establish a connection between a communication agent and a computing device.

9. The integrated circuit of claim 1, wherein the signal stream is comprised of signals received via at least one microphone.

10. A method for generating a weight file that causes an integrated circuit to generate wake signals by detecting desired user-specified signals and speakers, comprising:
    listing desired target signals and known users that may be detected by a signal detector;
    the signal detector configured to:
    remain in a low-power, always-on state wherein the signal detector remains continuously ready to detect target information comprising a specific keyword or a known user;
    operate in absence of an active connection to a communications network;
    generate a wake signal and transmit the wake signal to a host processor; and
    retrieving one or more signal databases that are comprised of standard target signals that may be detected by the signal detector;
    combining the desired target signals and the one or more signal databases to build a modified database;
    using the modified database to train a neural network implementation to recognize the target signals and the standard signals;
    producing a set of weights by way of training the neural network implementation;
    wherein the weights are i) modified dynamically based on feedback; ii) accessible in absence of a connection to a communications network; and iii) accessed by the signal detector to differentiate between signals received by the signal detector in absence of the connection to the communications network; and translating the set of weights into the weight file suitable for being stored in a memory storage that is accessible to the integrated circuit; and wherein the host processor includes a keyword identifier host processor configured to receive weighting signals and transmit one or more signals indicating detection of desired user-specified signals.

11. The method of claim 10, wherein the target signal includes at least one wake keyword.

12. The method of claim 10, wherein listing comprises entering the target signals into a computing device that is configured to generate the weight file.

13. The method of claim 10, wherein listing comprises entering the target signals into a cloud-based application that is configured to generate the weight file.

14. The method of claim 10, wherein listing comprises entering the target signals into a stand-alone software that is configured to generate the weight file.

15. The method of claim 10, wherein the target signals are comprised of signal patterns within input signals received via at least one microphone.

16. The method of claim 10, wherein the target signals may be spoken keywords, or non-verbal acoustic signals such as specific sounds.

17. The method of claim 10, wherein the neural network implementation is a software model of a neural network that is implemented in the integrated circuit comprising the signal detector.

18. The method of claim 10, wherein the weight file may be provided to an end-user upon purchasing a mobile device.

19. The method of claim 10, wherein upon an end-user installing the weight file the mobile device, the signal detector may detect the target signals by way of the set of weights.

* * * * *